US007542567B2

(12) United States Patent  
Torla et al.

(10) Patent No.: US 7,542,567 B2  
(45) Date of Patent: *Jun. 2, 2009

(54) METHOD AND APPARATUS FOR PROVIDING SECURITY IN A DATA PROCESSING SYSTEM

(75) Inventors: Michael J. Torla, Chandler, AZ (US); Thomas E. Tkacik, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 798 days.

This patent is subject to a terminal disclaimer.

(21) Appl. No.: 10/865,267

(22) Filed: Jun. 10, 2004

(65) Prior Publication Data

US 2005/0278549 A1    Dec. 15, 2005

(51) Int. Cl.
*H04L 9/00* (2006.01)
(52) U.S. Cl. .................. 380/44; 713/189; 713/153
(58) Field of Classification Search .................. 713/166
See application file for complete search history.

(56) References Cited

U.S. PATENT DOCUMENTS

| | | | |
|---|---|---|---|
| 6,170,057 B1 * | 1/2001 | Inoue et al. ............... | 713/153 |
| 7,020,282 B1 * | 3/2006 | Chang ....................... | 380/44 |
| 7,327,846 B1 * | 2/2008 | Chang ....................... | 380/285 |
| 2003/0110388 A1 | 6/2003 | Pavlin et al. | |
| 2005/0050362 A1 * | 3/2005 | Peles ......................... | 713/201 |

* cited by examiner

Primary Examiner—Pramila Parthasarathy
(74) Attorney, Agent, or Firm—Joanna G. Chiu; Susan C. Hill

(57) ABSTRACT

One embodiment relates to a data processing system having a cryptographic unit. The cryptographic unit includes cryptographic circuitry which performs a first cryptographic function to provide security for a portion of the cryptographic unit, and which performs a second cryptographic function to provide security for a portion of the data processing system external to the cryptographic unit. The cryptographic unit may therefore operate in a normal operating mode and in a secure operating mode. During a first secure operating mode a first key is used to decrypt first security configuration information which includes a second key. During a second secure operating mode, the second key is used to decrypt second security configuration information. The cryptographic unit may include a secure internal memory such that during the secure operating modes, the cryptographic unit may only process descriptors provided from this secure internal memory.

19 Claims, 4 Drawing Sheets

METHOD AND APPARATUS FOR PROVIDING SECURITY IN A DATA PROCESSING SYSTEM

FIELD OF THE INVENTION

The present invention relates generally to data processing systems, and more specifically, to providing security in a data processing system.

RELATED ART

Security in data processing systems may be used to protect sensitive information and applications. For example, a data processing system may require secure storage of keys, system parameters, or other sensitive information and applications which need to be protected from access or corruption. For example, smartcards used today have a built-in processor with permanently predefined internally stored functions. That is, the smartcards may only perform predefined functions where these predefined functions cannot be changed or altered after product manufacture. The ability to change or alter these functions after product manufacture may result in security breaches of the information within smartcards. For example, in order to change or alter these functions, some level of access to the security would have to be provided, thus increasing the risk of a security breach.

In another known solution, a dedicated security controller may be used to provide security within a data processing system. This requires duplication of some units in the data processing system which are also used to provide security (such as, for example, a cryptographic unit). In this manner, a user does not have access to those units within the dedicated security controller and thus corruption of the dedicated security controller is less likely. However, the duplication required with a dedicated security controller increases complexity and cost of the data processing system.

BRIEF DESCRIPTION OF THE DRAWINGS

The present invention is illustrated by way of example and not limited by the accompanying figures, in which like references indicate similar elements, and in which.

Figure 1:
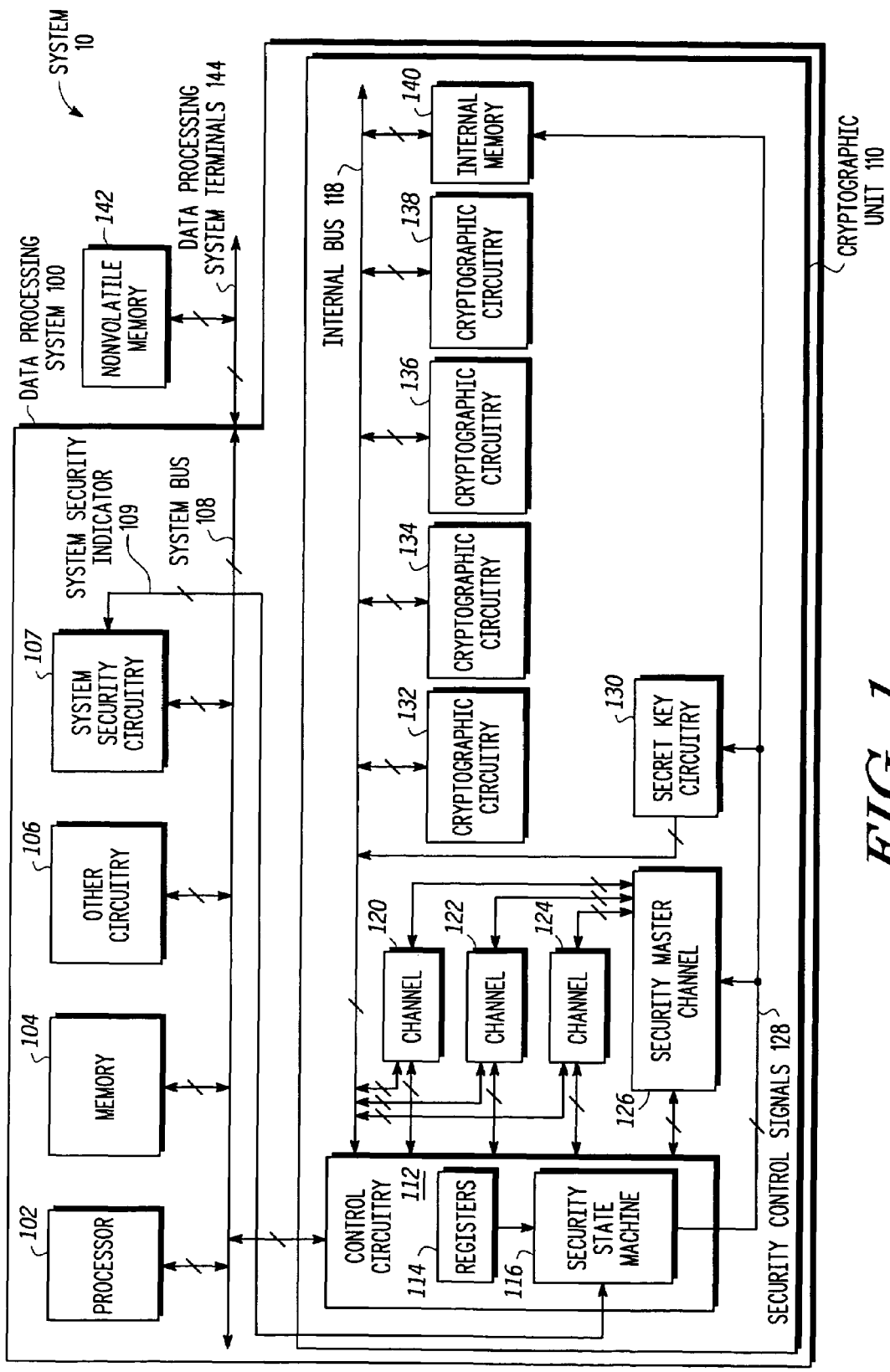
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Therefore, each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, those signals described as positive logic signals may be implemented as negative logic signals, and those signals described as negative logic signals may be implemented as positive logic signals.

Security controllers may be used within a data processing system to protect sensitive information and limit access to the sensitive information once decrypted. Security controllers also limit access to the security keys required to decrypt this sensitive information. In one embodiment of the present invention, a data processing system uses a cryptographic unit to provide this type of security when operating in a secure cryptographic mode of operation. In this embodiment, the encryption and decryption functions required to provide the security functions may be performed by the cryptographic unit, where this same cryptographic unit may operate as a normal cryptographic unit within the data processing system when the cryptographic unit is not operating in a secure cryptographic mode of operation. In this manner, a separate dedicated security controller is not needed.

One aspect of the present invention relates to a data processing system having a cryptographic unit. The cryptographic unit includes cryptographic circuitry which performs a first cryptographic function to provide security for a portion of the cryptographic unit, and which performs a second cryptographic function to provide security for a portion of the data processing system external to the cryptographic unit.

Another aspect of the present invention relates to a method for providing security in a data processing system having a cryptographic unit. The method includes operating in a normal operating mode of the cryptographic unit and entering a first secure operating mode of the cryptographic unit. In the first secure operating mode of the cryptographic unit, a first key is used to decrypt first security configuration information, where the first security configuration information includes a second key. A second secure operating mode of the cryptographic unit is entered, and, in the second security operating mode of the cryptographic unit, the second key is used to decrypt second security configuration information.

Yet another aspect of the present invention relates to a data processing system having a cryptographic unit. The cryptographic unit includes first storage circuitry for storing a first key, second storage circuitry for storing a second key, and cryptographic circuitry for performing a first cryptographic function to provide security for a portion of the cryptographic unit. The first cryptographic function uses at least one of the first and second keys. The cryptographic circuitry performs a second cryptographic function to provide security for a portion of the data processing system external to the cryptographic unit, where the second cryptographic function uses at least one of the first and second keys.

FIG. 1 illustrates one embodiment of a system 10 which includes a data processing system 100 and a nonvolatile memory 142 coupled to data processing system 100 via data processing system terminals 144. Data processing system 100 includes a processor 102, a memory 104, other circuitry 106, system security circuitry 107, a system bus 108, data processing system terminals 144, and a cryptographic unit 110. Processor 102, memory 104, other circuitry 106, and cryptographic unit 110 are all bidirectionally coupled to system bus 108. In one embodiment, processor 102 is any type of processor capable of executing instructions, such as, for example, a microprocessor, a digital signal processor, etc. Memory 104 can be any type of memory, such as, for example, a read only memory (ROM), a random access memory (RAM), a dynamic RAM (DRAM), a static RAM (SRAM), non-volatile memory (e.g. Flash), etc. Nonvolatile memory 142 may be any type of nonvolatile memory such as, for example, a Flash memory. Also, in the illustrated embodiment, nonvolatile memory 104 is external to cryptographic unit 110 and data processing system 100. However, in an alternate embodiment, it may be located internally within data processing system 100 and external to cryptographic unit 110. Other circuitry 106 may include any other type of circuitry within data processing system 100. For example, other circuitry 106 may include any number and type of peripherals such as, for example, a universal asynchronous receiver transmitter (UART), a real time clock (RTC), a keyboard controller, etc. Other circuitry 106 may also include other memories (of any type) and any type of input/output (I/O) circuitry which, for example, receives or provides information external to data processing system 100.

System security circuitry 107 includes a secure memory (such as, for example, a random access memory (RAM)) and a security monitor. The secure memory and the security monitor may be located separately, but are both generally located somewhere within data processing system 100. That is, system security circuitry 107 is generally located on-chip. The secure memory may store other cryptographic keys, certificates (blocks of data used in cryptographic protocols), and any other sensitive information that needs protection. The security monitor ensures that data processing system 100 is in a secure state at which point the secure memory may be accessed as needed. The security monitor continuously monitors data processing system 100 for security breaches which may include, for example, an external breach such as hackers breaking into the chip, an internal breach such as hardware failures or software failures (due, for example, to errant or runaway software), etc. Upon the security monitor detecting a security breach, the security monitor sends a signal to the secure memory to clear its contents and sends a signal to cryptographic unit 110. For example, in the illustrated embodiment of FIG. 1, system security circuitry 107 provides system security indicator 109 to cryptographic unit 110, which, when asserted, indicates that data processing system 100 is operating in a system secure mode and when negated, indicates that data processing system 100 is not operating in a system secure mode (i.e. that it is operating in a system insecure mode). Note that in alternate embodiments, other types of system security circuitry and mechanisms may be used to provide a system security indicator 109 to cryptographic unit 110. In yet another alternate embodiment, note that system security circuitry 107 may not be present, where data processing system 100 does not have corresponding system secure and system insecure modes.

In the illustrated embodiment of FIG. 1, cryptographic unit 110 includes control circuitry 112, channels 120, 122, and 124, security master channel 126, secret key circuitry 130, cryptographic circuitries 132, 134, 136, and 138, internal memory 140 (also referred to as storage circuitry 140), and internal bus 118. Control circuitry 112, secret key circuitry 130, cryptographic circuitries 132, 134, 136, and 138, and internal memory 140 are all bidirectionally coupled to internal bus 118. Control circuitry 112 is bidirectionally coupled to each of channels 120, 122, 124, and 126 and includes registers 114 and a security state machine 116. Security state machine 116 is coupled to registers 114, receives a system security indicator 109 from system security circuitry 107, and provides security control signals 128 to security master channel 126, to secret key circuitry 130, and to internal memory 140. Security master channel 126 is also bidirectionally coupled to each of channels 120, 122, and 124.

In operation, cryptographic unit 110 performs cryptographic functions for data processing system 100. In one embodiment, cryptographic unit 110 is a cryptographic accelerator. Cryptographic unit 110 is capable of normal cryptographic operation and secure cryptographic operation. During normal cryptographic operation, cryptographic circuitry is capable of performing cryptographic functions for data processing system 100. For example, it can provide security for a portion of data processing system 100 which is external to cryptographic unit 110, thus operating as a normal cryptographic unit. However, during secure cryptographic operation, cryptographic unit 110 performs cryptographic functions to provide security for at least a portion of itself (or just itself) while, for example, storing sensitive data within itself. Normal and secure cryptographic operations are described in more detail below.

During normal cryptographic/operation, cryptographic unit 110 processes descriptors from requesting devices. For example, cryptographic unit 110 may receive descriptors from processor 102 or any other device or unit coupled to system bus 108. In one embodiment, the requesting device provides the descriptor to cryptographic unit 110, via system bus 108, by writing a pointer to the descriptor into the appropriate channel. That is, the requesting device can select which channel (channel 120, 122, 124, or 126) to process the descriptor. Note that during normal operation, security master channel 126 operates the same fashion as channels 120, 122, and 124. Also, note that channels 120, 122, 124, and 126 allow for the processing of multiple descriptors simultaneously and each of channels 120, 122, 124, and 126 are coupled to internal bus 118 in a slave fashion.

In processing a descriptor during normal cryptographic operation, the selected channel requests that control circuitry 112 fetch a particular size data from a particular location, based on the information written to the selected channel by the requesting device. Therefore, control circuitry 112 may perform a direct memory access (DMA) function via, for example, system bus 108. When this DMA function is complete, the data is provided to the selected channel via internal bus 118. At this point, the selected channel may use the interface between itself and control circuitry 112 to request that the appropriate cryptographic circuitry (of, for example, cryptographic circuitries 132, 134, 136, and 138) be assigned to the selected channel. Once the appropriate cryptographic circuitry becomes available, control circuitry 112 assigns it to the selected channel. Therefore, note that control circuitry 112 also performs an arbitration function for the channels and cryptographic circuitries. The selected channel also extracts setup information for the appropriate cryptographic circuitry from the descriptor and provides this setup information to control circuitry 112 which writes this setup information into the appropriate cryptographic circuitry (thus setting up the appropriate cryptographic circuitry). Using the descriptor, the selected channel can then provide pointers and data sizes corresponding to the data to be extracted to control circuitry 112. Control circuitry 112 can then provide this extracted data to the appropriate cryptographic circuitry. The cryptographic circuitry can then perform its functions and, upon finishing, signal that it is done. At this point, the selected channel can schedule any cleanup activities that need to occur (such as, for example, extracting remaining data from the cryptographic circuitry and provide it to external memory, such as memory 104, and resetting the cryptographic circuitry which performed the functions). The selected channel can then signal to the requesting device that it has processed the provided descriptor (i.e. completed the requested operation).

Note that in the illustrated embodiment, cryptographic unit 110 includes 4 channels and 4 cryptographic circuitries. However, in alternate embodiments, any number of channels may be used (i.e. one or more) and they may be included in control circuitry 112. Also, note that any number and type of cryptographic circuitries may be used, depending on the cryptographic functions desired. For example, in one embodiment, each of cryptographic circuitries 132, 134, 136, and 138 may be designed to perform Advanced Encryption Standard (AES), Data Encryption Standard (DES), Message Digest #5 (MD5), Rivest, Shamir, Adleman (RSA), Secure Hash Algorithm Revision 1 (SHA-1), random number generation, or any other cryptographic algorithms.

During secure cryptographic operation, though, cryptographic unit 110 no longer operates as a normal cryptographic unit for data processing system 100. Therefore, processor 102 or any other device coupled to system bus 108 can no longer provide descriptors to cryptographic unit 110. At this point, cryptographic unit 110 can only execute those descriptors from internal memory 140 or those which are located in hardware within security master channel 126. Security state machine 116 controls transitions of cryptographic unit 110 between normal cryptographic operation (described above) and secure cryptographic operation. In secure cryptographic operation, security master channel 126 operates as a security master channel. Also, secret key circuitry 130 and internal memory 140 are used. Secure operation of cryptographic unit 110 will be described in more detail below in reference to FIGS. 2-4.

Figure 2:
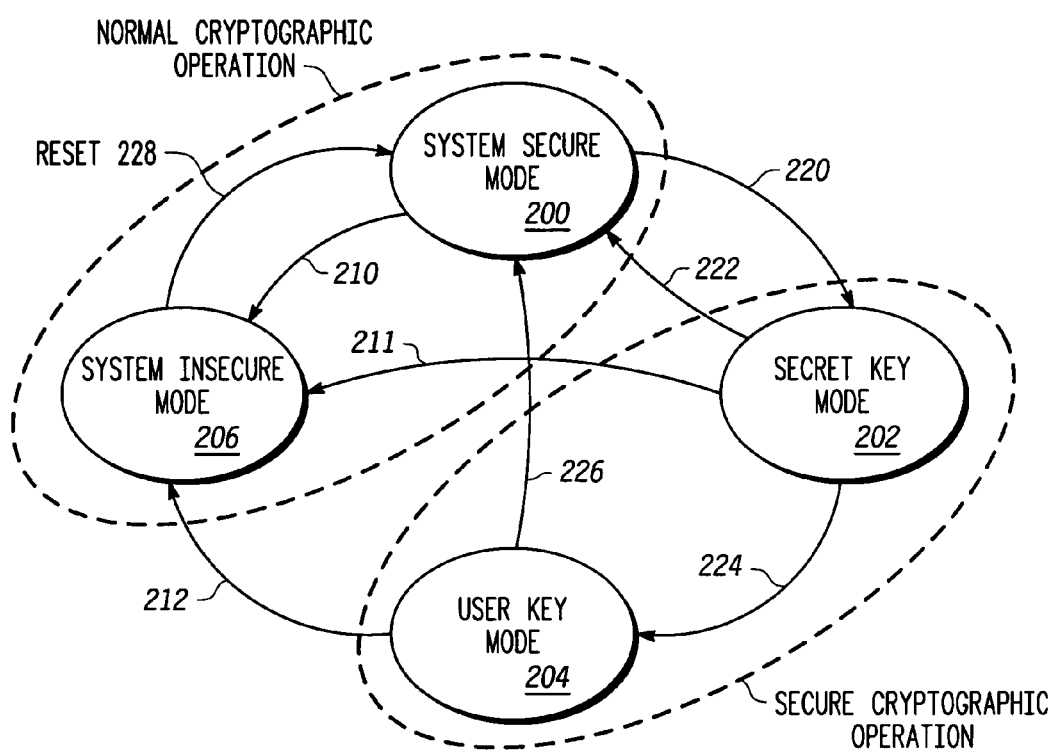
FIG. 2 illustrates a state machine corresponding to the cryptographic unit of the data processing system of FIG. 1, in accordance with one embodiment of the present invention.

FIG. 2 illustrates one embodiment of security state machine 116 of FIG. 1. State machine 230 of FIG. 2 illustrates 4 states: a system secure mode 200, a system insecure mode 206, a secret key mode 202, and a user key mode 204. Note that system secure mode 200 and system insecure mode 206 correspond to normal cryptographic operation of cryptographic unit 10 and secret key mode 202 and user key mode 204 correspond to secure cryptographic operation of cryptographic unit 110. Note that during normal cryptographic operation (described above), data processing system 100 may be in either a system secure mode or a system insecure mode, as determined, for example, by system security circuitry 107 described above in reference to FIG. 1. Therefore, system secure mode 200 corresponds to data processing system 100 operating normally within a system secure mode, as determined by system security circuitry 107 (which asserts system security indicator 109 when in a system secure mode). Upon system security circuitry 107 detecting a security breach, system security circuitry 107 may deassert system security indicator 109 which causes state machine 230 to transition (via transition 210) into system insecure mode 206.

Note that in one embodiment, the capabilities of data processing system 100 in system insecure mode 206 are greatly reduced. Alternatively, no functionality of data processing system 100 is allowed in system insecure mode 206. In the illustrated embodiment of FIG. 2, data processing system 100 can only return to system secure mode 200 (via transition 228) upon reset. Therefore, in one embodiment, cryptographic unit 110 operates as a normal cryptographic unit when data processing system 100 is in system secure mode 200 and not in system insecure mode 206. Alternatively, cryptographic unit 110 may operate in system secure mode 200 or in system insecure mode 206. Also note that in alternate embodiments, data processing system 100 may include any number of system modes in which cryptographic unit 100 may operate normally. For example, in one embodiment, data processing system 100 may not include system security circuitry 107 where data processing system 100 does not include different security modes. In this case, state machine 230 may only include a single state within the normal cryptographic operation portion of state machine 230. Alternatively, data processing system 100 may operate in various modes, each having a different level of security, where cryptographic unit 110 may operate normally in all or some of these different modes.

In the illustrated embodiment, cryptographic unit 10 can transition into secure cryptographic operation from normal cryptographic operation by transitioning from system secure mode 200, via transition 220, to secret key mode 202. That is, in the illustrated embodiment, cryptographic unit 110 can only transition to secure cryptographic operation when data processing system 110 is operating in a secure mode, i.e. in system secure mode 200. Note that cryptographic unit 110 can transition back from secure cryptographic operation to normal cryptographic operation by transitioning from secret key mode 202, via transition 222, to system secure mode 200 or by transitioning from user key mode 204, via transition 226, to system secure mode 200. Therefore, as illustrated in FIG. 2, secure cryptographic operation includes two states: secret key mode 202 and user key mode 204.

These states will be described in more detail in reference to FIGS. 3 and 4 below. Also, transitions between these states (e.g. transitions 220, 222, 224, and 226) can be controlled in various different ways. For example, some or all of these transitions may be controlled by programmable bits within registers 114. Alternatively, different conditions may trigger some or all of these transitions.

As was described above, upon system security circuitry 107 detecting a security breach, system security circuitry 107 may negate system security indicator 109. In the illustrated embodiment of FIG. 2, upon negation of system security indicator 109, state machine 230 transitions to system insecure mode 206, via transition 210, 211, or 212, depending on the state of state machine 230 in which the breach occurred. Therefore, in the illustrated embodiment, detection of a system security breach always causes a transition into system insecure mode 206, regardless of the current state of state machine 230.

Figure 3:
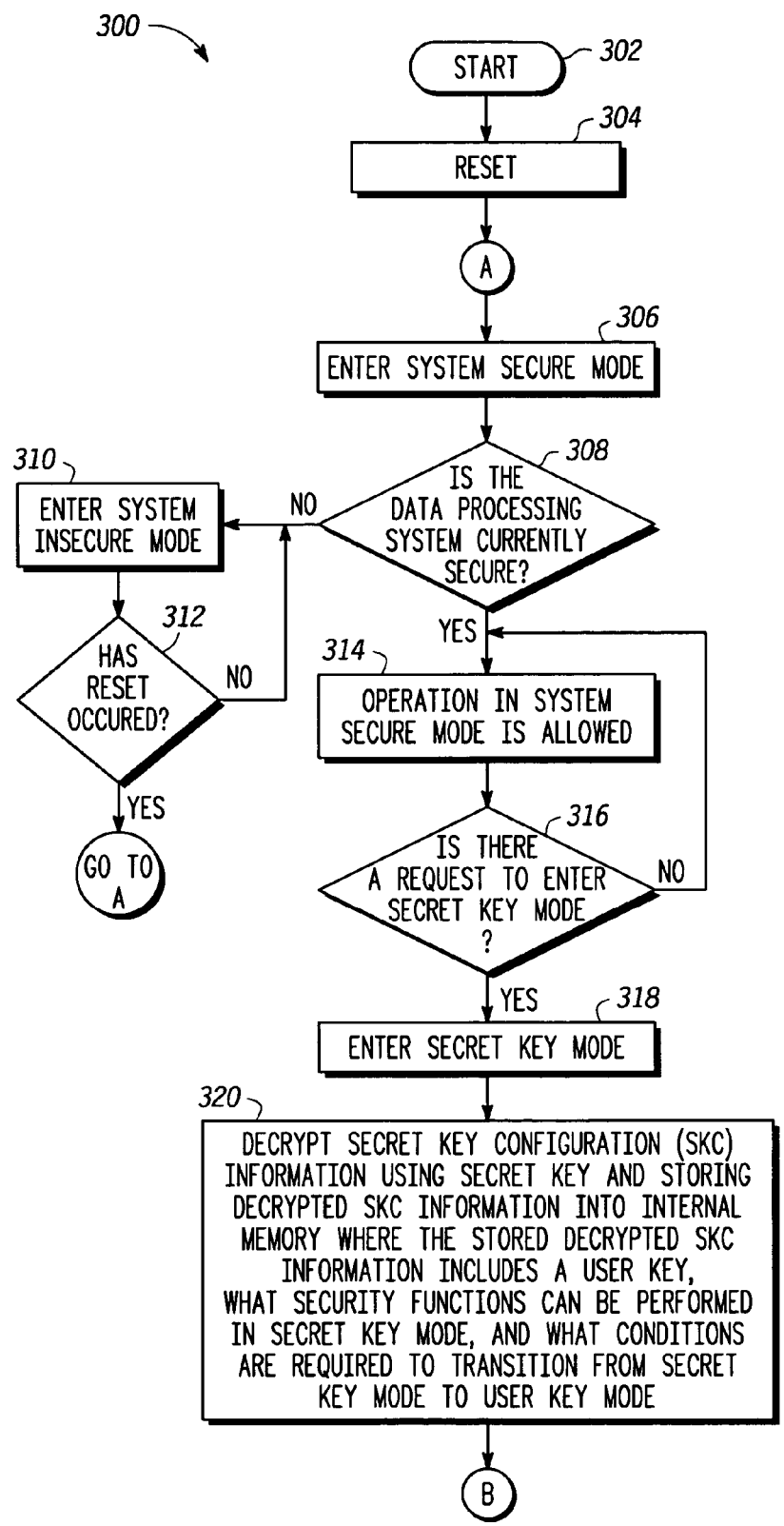
FIGS. 3-4 illustrate, in flow diagram form, operation of the cryptographic unit of the data processing system of FIG. 1, in accordance with one embodiment of the present invention.
Figure 4:
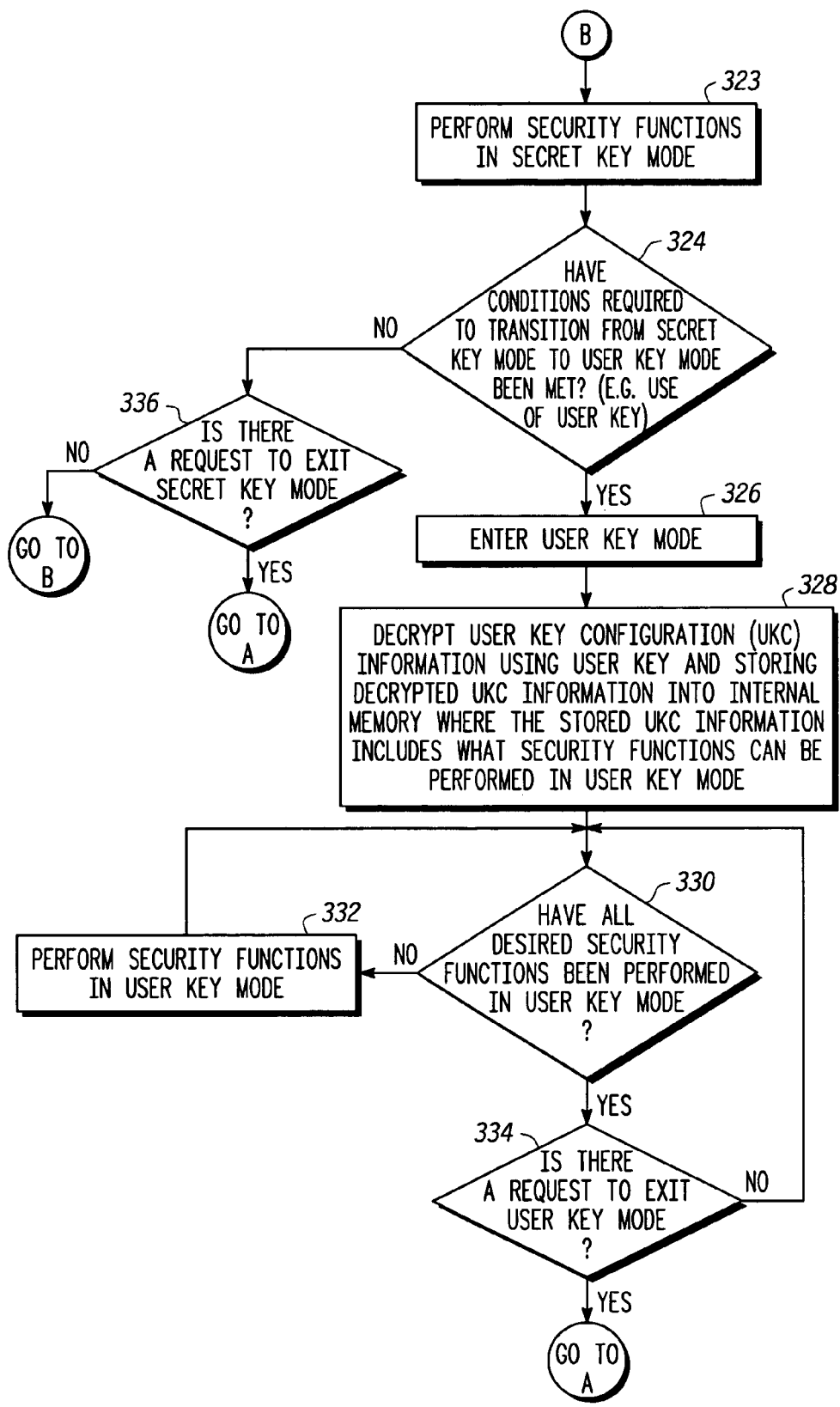

FIGS. 3-4 illustrate more detailed operation of system secure mode 200, secret key mode 202, and user key mode 204 of state machine 230, in accordance with one embodiment of the present invention. Flow 300 of FIG. 3 begins with start 302 and proceeds to reset 304. That is, in block 304, a reset of data processing system 100 is performed. Flow 300 then proceeds to block 306 where a system secure mode is entered. Therefore, in one embodiment, any time a system reset is performed, data processing system 100 enters a system secure mode, e.g. system secure mode 200 of FIG. 2. After entering secure mode in block 306, flow proceeds to decision diamond 308 where it is determined whether data processing system 100 is currently secure. For example, this may be determined by the system security monitor. If data processing system 100 is not in a system secure mode, flow proceeds to block 310 where a system insecure mode is entered (as described above in reference to transition 210 of FIG. 2 from system secure mode 200 to system insecure mode 206). Referring to FIG. 3, data processing system 100 remains in insecure system mode until a reset occurs (as determined by decision diamond 312), where, upon reset, flow returns to block 306 via point A.

Referring back to decision diamond 308, if data processing system 100 is currently secure, then flow proceeds to block 314 where operation in system secure mode is allowed (corresponding, for example, to state 200 of FIG. 2). Flow then proceeds to decision diamond 316 where it is determined if there is a request to enter secret key mode. If not, flow returns to block 314, and if so, flow proceeds to block 318 where secret key mode is entered (corresponding, for example, to transition 220 from system secure mode 200 to secret key mode 202 of FIG. 2). Also, although not illustrated in FIG. 3, note that when operating in system secure mode, any time the system security monitor detects a system secure breach, data processing system 100 enters system insecure mode, thus proceeding to block 310 (corresponding, for example, to transition 210 of FIG. 2).

A request to enter secret key mode may be provided via a user programmable register bit which may be stored within control circuitry 112. In another embodiment, a request to enter secret key mode may be received by control circuitry 112 via a signal on system bus 108. Alternatively, other methods may be used to request to enter secret key mode. A request to enter secret key mode may be provided, for example, when access to secure functions or information is desired. Once in secret key mode, cryptographic unit 110 enters secure cryptographic operation in which it no longer operates as a cryptographic unit for data processing 100. For example, in one embodiment described above, cryptographic unit 110, during secure cryptographic operation, can only execute descriptors located within cryptographic unit 110, such as in internal memory 140 or security master channel 126, and cannot receive descriptors from elsewhere within data processing system, outside of cryptographic unit 110.

Referring back to FIG. 3, flow proceeds to block 320, where, in secret key mode, secret key configuration (SKC) information is decrypted using the secret key and then this decrypted SKC information is stored into internal memory 140. The SKC information may include any type of information such as, for example, descriptors and keys. For example, the SKC information may include descriptors which may be used by cryptographic unit 110 in secure key mode and may include additional keys which may be used to decrypt other information that is to be stored in internal memory 140 and used by cryptographic unit 110. This SKC information has been previously encrypted using the secret key and stored within system 10, such as in nonvolatile memory 142. This may be done, for example, during product manufacture, where the manufacturer who programs the secret key into secret key circuitry 130 determines what is to be included in the SKC information and can therefore encrypt this SKC information using the secret key. Alternatively, the secret key may be provided to an OEM (Original Equipment Manufacturer) who, for example, creates a chip having a cryptographic unit such as cryptographic unit 110. In this case, the OEM can decide what SKC information to encrypt with the secret key and store this encrypted information within system 10. Therefore, once data processing system 100 leaves the control of the OEM, access to the secret key to encrypt information may no longer be allowed.

In the illustrated embodiment, the encrypted SKC information is stored in nonvolatile memory 142 which is external to data processing system 100; however, in alternate embodiments, it may be stored in a memory within data processing system 100. In the illustrated embodiment, this information is stored in nonvolatile memory such that this information cannot be changed or corrupted after being stored. However, alternate embodiments may store this encrypted SKC information in any type of memory. Furthermore, since it is stored in its encrypted form, it can only be accessed with the secret key, which is kept secure within cryptographic circuitry 110.

The secret key is stored in secret key circuitry 130 which may include, for example, one time programmable storage circuitry for storing the secret key. For example, fuses may be used to store the secret key. In one embodiment, fuses whose programmed state cannot be easily physically seen are used to prevent physical observation of the fuses to obtain the secret key. The secret key may be stored in a non-encrypted form since it is stored in secure circuitry which is not accessible outside of cryptographic unit 110. That is, secret key circuitry 130 and internal memory 140 are accessible by cryptographic unit 110 but are not accessible by the remaining portions of data processing system 100.

Referring back to block 320 of FIG. 3, upon entering secret key mode, security master channel 126 may process an internally stored descriptor (stored, for example, within security master channel 126) which instructs configuration circuitry 110 how to obtain, decrypt, and store the SKC information. In one embodiment, security master channel 126 waits to process this descriptor until the other channels finish any processing they are doing. Alternatively, security master channel 126 can halt the other channels and immediately start processing its internal descriptor or descriptors. Security master channel 126 can then request that control circuitry 112 access the encrypted SKC information from nonvolatile memory 142 and provide it to security master channel 126 via internal bus 118. For example, security master channel 126 may determine the appropriate cryptographic circuitry, extract setup information for the appropriate cryptographic circuitry from the internal descriptor, and provide this setup information to control circuitry 112 which writes this setup information into the appropriate cryptographic circuitry (thus setting up the appropriate cryptographic circuitry). Using the internal descriptor, the selected channel can then provide pointers and data sizes corresponding to the SKC information to be extracted to control circuitry 112. Control circuitry 112 can then provide this extracted data to the appropriate cryptographic circuitry.

The cryptographic circuitry, under direction of security master channel 126, can then decrypt the extracted SKC information using the secret key from secret key circuitry 130. At this point, security master channel 126 instructs control circuitry 112 to store this decrypted SKC information into internal memory 140.

In the embodiment of FIG. 3, the decrypted SKC information in internal memory 140 includes a user key, what security functions can be performed in secret key mode, and what conditions are required to transition from secret key mode to user key mode. At this point, flow proceeds from block 320, via point B, to block 323 of FIG. 4 where the security functions in secret key mode are performed (where these security functions are included in the SKC information which provides which security functions can be performed in SKC mode). In one embodiment, the security functions to be performed in secret key mode are selected by any processing unit coupled to cryptographic unit 110 via system bus 108. In this embodiment, the processing unit may specify functions to be performed just as it does in the insecure operating mode; however, the processing unit may only specify functions using the descriptors stored in internal memory 140. Therefore, the functions which may be performed in SKC mode are determined by the set of descriptors stored in internal memory 140.

Flow proceeds to decision diamond 324 where it is determined whether conditions required to transition from secret key mode to user key mode have been met. If not, flow proceeds to decision diamond 336 where it is determined whether there is a request to exit secret key mode, where, in one embodiment, the request to exit secret key mode corresponds to the deassertion of the programmable bit that was asserted to request entry into secret key mode (where, for example, this bit may be located in registers 114). In alternate embodiments, different types of requests to exit secure key mode may be used. For example, processor 102 may deassert a different programmable bit or send a signal via system bus 108 to request exit from secret key mode. If a request to exit is not received, flow returns to block 320 via point B where cryptographic unit 110 remains in secret key mode. However, if a request is received, then cryptographic unit 110 returns to normal cryptographic operation in system secure mode at block 306 via point A (corresponding, for example, to transition 222 of FIG. 2). Note that although not illustrated in FIG. 3, in one embodiment, at any time while in secret key mode, data processing system 100 may enter system insecure mode when the system security monitor detects a system secure breach. In this case, flow would proceed to block 310 where a reset is required to exit system insecure mode (corresponding, for example, to transition 211 of FIG. 2).

Referring back to decision diamond 324 of FIG. 4, if the conditions required to transition from secret key mode to user key mode have been met, then flow proceeds to block 326 where user key mode is entered (corresponding, for example, to transition 224 of FIG. 2).

In one embodiment, a condition to transition from secret key mode to user key mode includes the use of a user key which is provided as part of the SKC information which has been decrypted and stored in internal memory 140. That is, in this embodiment, once the user key is used, a transfer to user key mode is triggered. Note that in alternate embodiments, any number of user keys may be provided as part of the SKC information where the use of any of the user keys may trigger a transition to user key mode. Also, note that other conditions may trigger the transition such as, for example, the setting of a programmable bit, the receipt of a signal, etc.

In one embodiment, upon entering user key mode, user key configuration (UKC) information is decrypted using the user key and stored into internal memory 140. The UKC information may be accessed and decrypted by security master channel 126 similar to how the SKC information was accessed and placed into internal memory during secret key mode, which was described above in reference to the SKC information. However, in user key mode, the user key and not the secret key is used to decrypt the information. In one embodiment, once in user key mode, the secret key can no longer be used. This prevents access to the secret key during user key mode, which helps provide security for the secret key. In one embodiment, the decrypted UKC information overwrites all the SKC information in internal memory 140 such that none of the SKC information is accessible in user key mode. Alternatively, the UKC information may be stored along with the SKC information or may overwrite only portions of the SKC information. In this manner, access to the SKC information may be partially or fully prevented during user key mode, as desired.

The UKC information may include any type of information needed in user key mode. For example, the UKC information may include those security functions which can be performed in user key mode. In one embodiment, the OEM provides the functions within the UKC information which may be performed during user key mode. Also, within the UKC information, the OEM may provide a user of data processing system 100 a function which allows the user to encrypt and decrypt information using the user key if the OEM wishes to allow the user to make modifications to the UKC information using the user key. In this manner, the user key mode may be used to limit damage by allowing the use of a user key rather than allowing the use of the secret key for post manufacture modifications. For example, if a user were allowed the use of the secret key for encryption and decryption, the user may be able to reverse engineer the secret key and thus gain access to sensitive information and applications. However, with the use of a user key provided as part of the SKC information, a user may be given the opportunity to use a security key without being provided access to a more secure secret key. In alternate embodiments, the SKC information may include any number of user keys. In yet other embodiments, the user key may then be used to decrypt other user keys which may then be accessible to the user rather than the user key. This would add an additional layer of security. Therefore, in these embodiments, additional secure cryptographic states may be used in addition to the secret key and user key modes. Also note that in the illustrated embodiments, the SKC information and the UKC information are used only in secure cryptographic operation and not used or accessible during normal cryptographic operation.

Referring back to FIG. 4, flow then proceeds from block 328 to decision diamond 330 where it is determined whether all the desired security functions in user key mode have been performed. If not, flow proceeds to block 332 where the desired security functions in user key mode are performed, and flow returns to decision diamond 330. If, at decision diamond 330, all the desired security functions in user key mode have been performed, then flow proceeds to decision diamond 334 where it is determined whether a request to exist user key mode is provided. In one embodiment, the request to exit user key mode corresponds to the deassertion of the programmable bit that was asserted to request entry into secret key mode. In alternate embodiments, different types of requests to exit user key mode may be used. For example, processor 102 may send a signal via system bus 108 to request exit from user key mode.

If, at decision diamond 334, a request to exit user key mode is not received, flow returns to decision diamond 330. If, at decision diamond 334, a request to exit user key mode is received, flow returns to block 306 via point A where system secure mode is entered (corresponding, for example, to transition 226 of FIG. 2) Note that although not illustrated in FIG. 3, in one embodiment, at any time while in user key mode, data processing system 100 may enter system insecure mode when the system security monitor detects a system secure breach. In this case, flow would proceed to block 310 where a reset is required to exit system insecure mode (corresponding, for example, to transition 212 of FIG. 2).

Note that state machine 116 within control circuitry 112 may be used to control operation of cryptographic unit 110 according to the flow diagrams of FIGS. 3 and 4. State machine 116 (and the operations of FIGS. 3 and 4) may be embodied in software, firmware, hardware, or any combination thereof. Also, note that in alternate embodiments, state machine 116 may include different, fewer, or additional states, and the flow diagrams of FIGS. 3 and 4 may include fewer, different, or additional operations, or portions of the flow may be ordered differently. Also, state machine 116 may be located anywhere within cryptographic unit 110. Similarly, note that system 10 of FIG. 1 or any portion of system 10, in alternate embodiments, may also include different, fewer, or additional units, circuitries, or elements as needed.

Therefore, it can be appreciated how the use of a secret key mode and a user key mode during secure cryptographic operation allows for the ability to provide security within data processing system 100 and cryptographic unit 110 without the need for a separate cryptographic unit. For example, cryptographic unit 110 is able to operate as a normal cryptographic unit (such as a cryptographic accelerator) for data processing system 100 during normal cryptographic operation in which cryptographic unit 110 performs security functions for portions of data processing system 100 external to cryptographic unit 110 (where, for example, cryptographic unit 110 is able to receive descriptors from various units within data processing system 100) and is able to operate as a secure cryptographic unit during secure cryptographic operation in which cryptographic unit 110 provides security for at least a portion of itself (such as, for example, by providing security for, while permitting the use of, the secret key and/or the user key and/or any other sensitive data) and is therefore, no longer able to receive descriptors from units within data processing system 100 external to cryptographic unit 110. Furthermore, the use of a secret key mode and a user key mode allows for the increased protection of the secret key thus giving the manufacturers of data processing system 100 (e.g. the OEMs) the ability to control which cryptographic functions are available in each mode. In this manner, the manufacturers can provide the user the ability to modify operation of user key mode, while still maintaining a more secure secret key.

In the foregoing specification, the invention has been described with reference to specific embodiments. However, one of ordinary skill in the art appreciates that various modifications and changes can be made without departing from the scope of the present invention as set forth in the claims below. For example, any software taught herein may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Also, the block diagrams may include different blocks than those illustrated and may have more or less blocks or be arranged differently. Also, the flow diagrams may also be arranged differently, include more or less steps, be arranged differently, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system having a cryptographic unit, wherein the cryptographic unit comprises:
cryptographic circuitry which performs a first cryptographic function to provide security for a portion of the cryptographic unit, and which performs a second cryptographic function to provide security for a portion of the data processing system external to the cryptographic unit, wherein the first cryptographic function is performed during secure cryptographic operation, and wherein the second cryptographic function is performed during normal cryptographic operation.

2. A data processing system as in claim 1, wherein the cryptographic unit further comprises:
control circuitry which controls transitioning between normal cryptographic operation and secure cryptographic operation, wherein the control circuitry is couples to the cryptographic circuitry.

3. A data processing system as in claim 2, wherein the control circuitry comprises a user programmable register bit which initiates a transition between normal cryptographic operation and secure cryptographic operation.

4. A data processing system as in claim 2, wherein the control circuitry comprises a state machine.

5. A data processing system as in claim 1, wherein the cryptographic unit further comprises:
first storage circuitry which stores a first key, wherein the first key is stored in non-encrypted form.

6. A data processing system as in claim 5, wherein the first storage circuitry is one-time writable storage circuitry.

7. A data processing system as in claim 5, wherein the cryptographic unit further comprises:
second storage circuitry which stores a second key, wherein the second key is decrypted using the first key.

8. A data processing system as in claim 7, wherein the second storage circuitry stores first configuration information which is decrypted using the first key and wherein the second storage circuitry stores second configuration information which is decrypted using the second key.

9. A data processing system as in claim 8, wherein once the second configuration information is stored in the second storage circuitry, the first key is no longer used to perform decryption without first exiting secure cryptographic operation.

10. A data processing system as in claim 8, wherein the first configuration information and the second configuration information are used during secure cryptographic operation and are not used during normal cryptographic operation.

11. A method for providing security in a data processing system having a cryptographic unit, the method comprising:
operating in a normal operating mode of the cryptographic unit;
entering a first secure operating mode of the cryptographic unit;
in the first secure operating mode of the cryptographic unit, using a first key to decrypt first security configuration information, wherein the first security configuration information includes a second key;

entering a second secure operating mode of the cryptographic unit; and in the second security operating mode of the cryptographic unit, using the second key to decrypt second security configuration information.

12. A method as in claim 11, further comprising:

performing configuration of the cryptographic unit in at least one of the first and second secure operating modes.

13. A method as in claim 11, further comprising:

returning to the normal operating mode of the cryptographic unit from at least one of the first and second secure operating modes.

14. A method as in claim 11, further comprising:

in the second security operating mode of the cryptographic unit, using at least one descriptor from the second security configuration information to define a security function; and performing the security function.

15. A method as in claim 14, wherein the step of performing the security function comprises:

providing data external to the data processing system.

16. A method as in claim 14, wherein the step of performing the security function comprises:

retrieving third security configuration information;

decrypting the third security configuration information using the second key; and storing the decrypted third security configuration information in the cryptographic unit.

17. A data processing system having a cryptographic unit, wherein the cryptographic unit comprises:

first storage circuitry for storing a first key;

second storage circuitry for storing a second key, first configuration information, and second configuration information; and cryptographic circuitry for performing a first cryptographic function to provide security for a portion of the cryptographic unit, wherein the first cryptographic function uses at least one of the first and second keys, said cryptographic circuitry performing a second cryptographic function to provide security for a portion of the data processing system external to the cryptographic unit, wherein the second cryptographic function uses at least one of the first and second keys, and wherein said cryptographic circuitry decrypts the first configuration information using the first key and decrypts the second configuration information using the second key.

18. A data processing system as in claim 17, wherein the first key cannot be changed.

19. A data processing system as in claim 17, wherein the second key is decrypted using the first key.

* * * * *